United States Patent [19]
Naito et al.

[11] Patent Number: 4,938,604
[45] Date of Patent: Jul. 3, 1990

[54] VEHICLE SPEED CONTROL DEVICE

[75] Inventors: Yasuo Naito; Akihiko Mori, both of Hyogo, Japan

[73] Assignee: Mitsubishi Denki Kabushiki Kaisha, Tokyo, Japan

[21] Appl. No.: 212,371

[22] Filed: Jun. 27, 1988

[30] Foreign Application Priority Data

Jun. 26, 1987 [JP] Japan .................. 62-160334

[51] Int. Cl.$^5$ .................. B60K 41/18; G05D 13/62
[52] U.S. Cl. .................. 364/426.04; 364/424.1; 180/179; 74/862
[58] Field of Search .......... 364/426.04, 424.1, 424.01, 364/431.07, 565; 180/197, 176, 179; 123/352; 74/856, 862; 324/161, 162, 163

[56] References Cited

U.S. PATENT DOCUMENTS

| | | | |
|---|---|---|---|
| 4,408,293 | 10/1983 | Avins | 364/426.04 |
| 4,539,642 | 9/1985 | Mizuno et al. | 364/426.04 |
| 4,658,360 | 4/1987 | Osanai et al. | 364/424.1 |
| 4,675,817 | 6/1987 | Sakakiyama et al. | 364/424.1 |
| 4,718,012 | 1/1988 | Oshiage | 364/424.1 |
| 4,737,913 | 4/1988 | Blee et al. | 364/426.04 |
| 4,766,544 | 8/1988 | Kurihara et al. | 364/424.1 |
| 4,771,848 | 9/1988 | Namba et al. | 180/197 |

Primary Examiner—Thomas G. Black
Attorney, Agent, or Firm—Sughrue, Mion, Zinn, MacPeak & Seas

[57] ABSTRACT

A vehicle speed control device for holding a vehicle speed constant includes a control amount integrating means for simulating a variation of driving force by integrating the control amount time and a gear change judging means responsive to a speed deviation between an actual speed and a desired speed and an integrated amount for providing a signal to an automatic transmission means for changing the gear ratio when the deviation or the integrated amount exceeds a predetermined value and returning the gear ratio when the deviation or the integrated amount becomes lower than the predetermined value.

2 Claims, 5 Drawing Sheets

VEHICLE SPEED CONTROL DEVICE

BACKGROUND OF THE INVENTION

The present invention relates to a vehicle speed control device for automatically maintaining a constant vehicle speed.

An example of a conventional device of such type is disclosed in Japanese patent application Laid-open No. 39311/1983 which is shown schematically in FIG. 8 of this application. In FIG. 8, when a main switch 5 is closed by an operator of a vehicle and a battery 4 is connected to a control device 6 which includes a processing circuit 6a such as a microcomputer, the latter starts to process an output of a speed sensor 3 which comprises four magnetic poles, a rotary member 3a adapted to be rotated by a meter cable (not shown) by which a rotation of a transmission (not shown) is transmitted and a read switch 3b. The speed sensor 3 produces a pulse signal having a frequency proportional to a vehicle speed $v_s$ and the control device 6 measures a period of this pulse signal to obtain the vehicle speed $v_s$. Then, when the operator closes a set switch 1 for giving an instruction of commencement of constant speed running, a signal is given to the control device 6 in which the speed $v_s$ at the time when the set switch 1 is closed is stored as a desired speed $v_r$ and constant speed control is started. Thereafter, the control device 6 compares the desired speed $v_r$ with an actual speed $v_s$ which may from time to time to provide a control signal corresponding to a difference therebetween. Thus, a motor type throttle actuator 7 is provided in a suction passage 8 or the engine which is responsive to various control signals from the control device 6 to rotate a link 7a by a motor connected thereto by means of an electromagnetic clutch to thereby regulate an opening of a throttle valve 9 through a rod 7b. That is, the throttle valve 9 is controlled such that, when the actual speed $v_s$ is lower than the desired speed $v_r$, its opening is increased to a predetermined value by a throttle opening signal and, when it is higher than the desired speed, the opening is decreased. Therefore, it is possible to run the vehicle at a constant speed without necessity of acceleration pedal operation by the operator.

When the operator operates a brake device during such constant speed running control, a cancelling switch 2 for removing the constant speed running control is actuated to provide a cancelling signal to the control device 6. Upon the cancelling signal, the control device 6 provides a signal immediately upon which the actuator 7 causes the electromagnetic clutch to be separated. Thus, the operator can select the running speed by his operation of the acceleration pedal.

In such a conventional speed control device, however, the speed control is performed without taking an inclination of the road and/or a vehicle weight into consideration. Therefore, when the vehicle is going uphill, for example, a high gear ratio may be maintained, or, in downhill movement, a low gear ratio may be maintained continuously.

SUMMARY OF THE INVENTION

An object of the present invention is to provide a vehicle running speed control device capable of automatically maintaining a constant vehicle speed while changing the gear ratio correspondingly to a resistance given to a running vehicle.

According to the present invention, the above object can be achieved by a running speed control device comprising an acceleration detector responsive to a running speed signal from a running speed detector to detect an acceleration at a predetermined time interval, a desired speed signal generator responsive to signal from a desired speed setting means for setting a desired constant speed, for generating an aimed speed signal, a speed deviation calculating means for obtaining a speed deviation of a running speed from the constant speed, a control amount calculating means responsive to the acceleration and the speed deviation for controlling a driving power of the vehicle such that the running speed becomes equal to the aimed constant speed, a driving force means responsive to a control amount obtained by the control amount calculating means for changing a driving force of the vehicle, an automatic transmission means for automatically changing the gear ratio, a control amount integrating means for simulating a variation of driving force by integrating the control amount time to time and a gear change judging means responsive to the speed deviation and the integrated amount for providing a signal to the automatic transmission means for changing the gear ratio when the deviation or the integrated amount exceeds a predetermined value and returning the gear ratio when the deviation or the integrated amount becomes below the predetermined value.

In the present invention, the control amount integrating means and the gear change judging means, make the gear change correspond to the running resistance that the running vehicle is subjected to.

DETAILED DESCRIPTION OF THE PREFERRED EMBODIMENT

Figure 1:
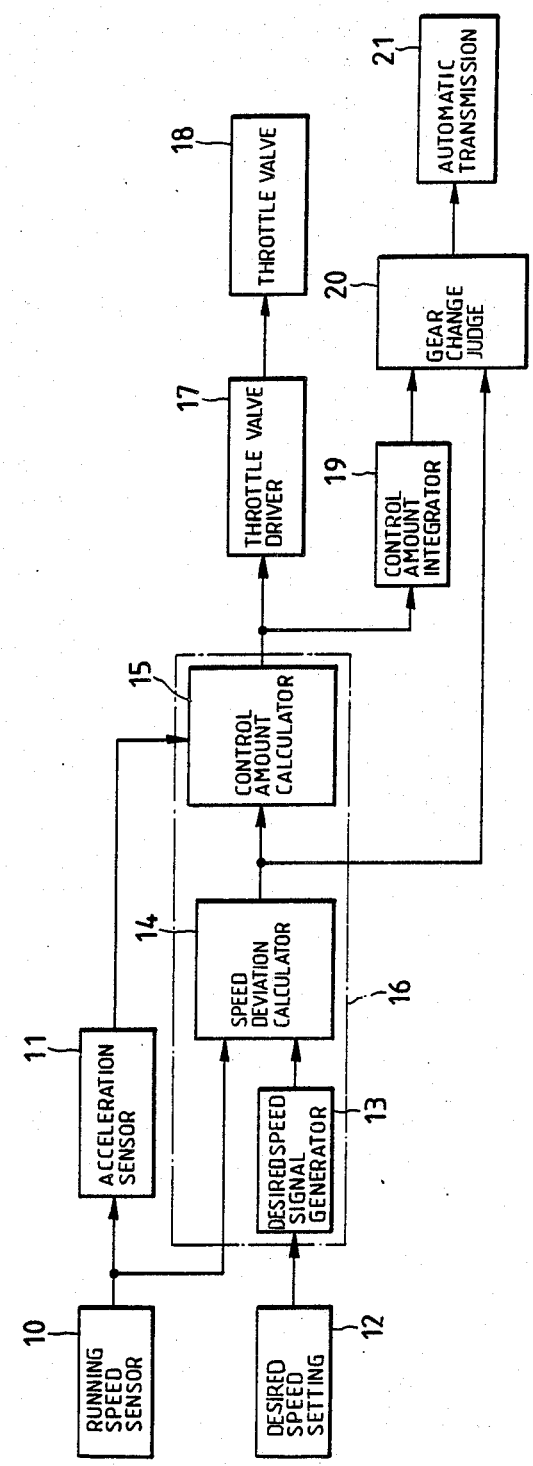
FIG. 1 is a block diagram of an embodiment of the present invention.
Figure 2:
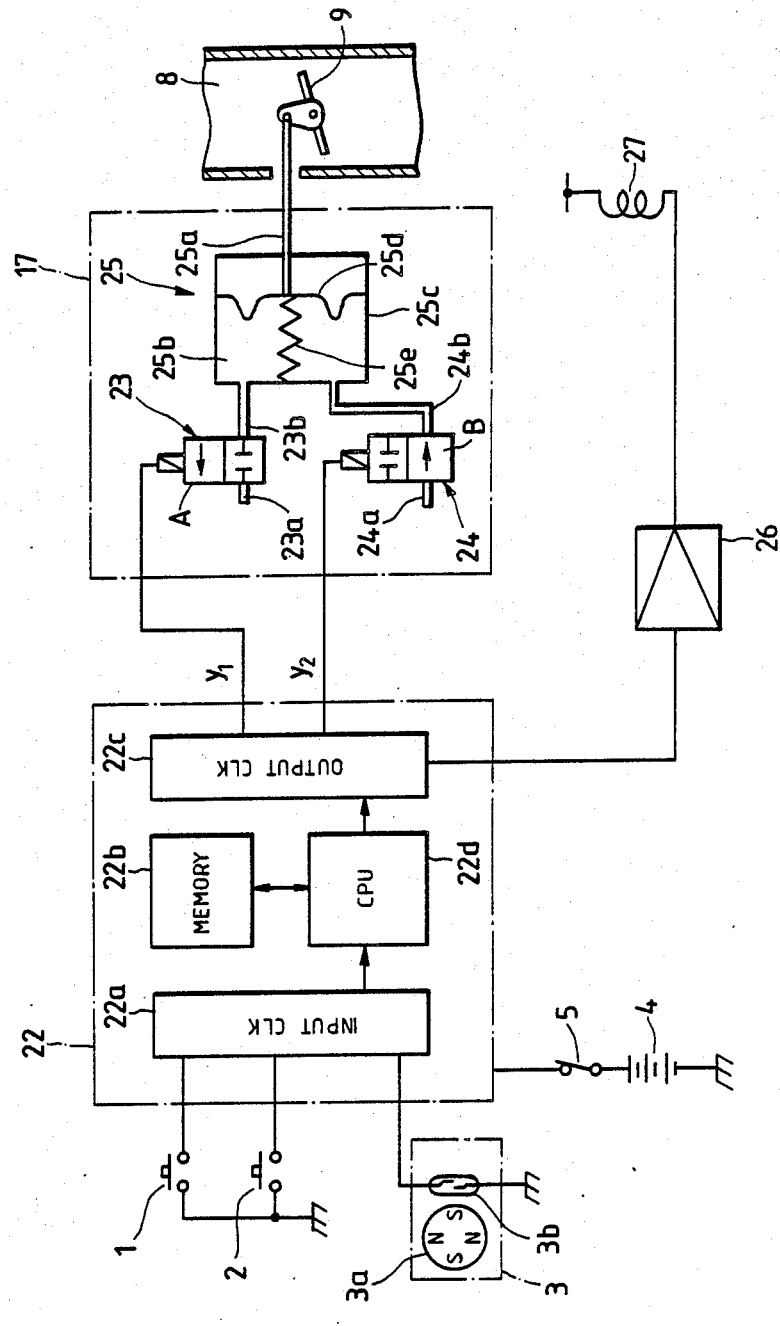
FIG. 2 is a block diagram of a control system in the circuit in FIG. 1.
Figure 8:
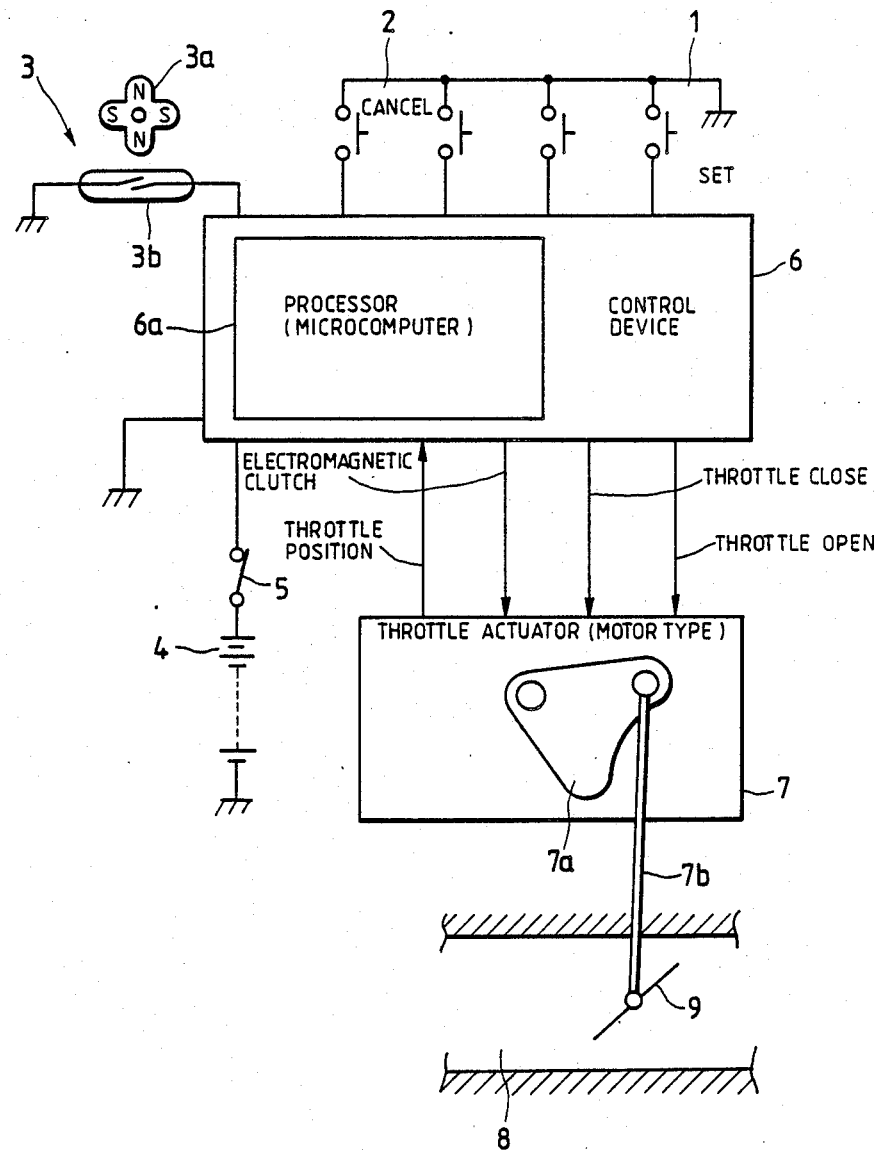
FIG. 8 is a block diagram of a conventional device.

In FIGS. 1 and 2 in which same or corresponding components to those shown in FIG. 8 are depicted by same reference numerals, respectively, a reference numeral 10 depicts a speed detector for detecting a running speed of a vehicle, 11 an acceleration detector responsive to a running speed signal from the speed detector 10 for detecting an acceleration of the vehicle at a predetermined time interval, 12 a desired speed setting means for manually setting a desired speed, 13 a desired speed signal generating means responsive to an output of the aimed speed setting means for producing a desired speed signal indicative of the desired speed, 14 a speed deviation calculating means responsive to the desired speed signal and the running speed signal for producing a speed deviation signal and 15 a control amount calculating means responsive to the speed deviation signal and the acceleration signal from the acceleration detector 11 for producing control signals. The control amount calculating means 15, the desired speed signal generator 13 and the speed deviation calculator 14 constitute a driving force control means 16.

A reference numeral 17 depicts a throttle valve driving means responsive to the control signal from the control amount calculating means 15 for driving a throttle valve 18 for controlling an output of an engine, 19 a control amount integrating means for integrating the control signal on a time to time basis to simulate a variation of the driving force and 20 a gear change judging means responsive to the speed deviation and an output of the control amount integrating means 19 for producing an instruction signal ordering an automatic change of gear ratio to an automatic gear shift means 21 when the integrated value or the speed deviation exceeds a predetermined value and ordering the gear shift means 21 to return the gear ratio when the deviation or the integrated value becomes lower than the predetermined value.

In FIG. 2, reference numerals 1 to 5, 8 and 9 depict the same components as those depicted by the same numerals in FIG. 8. A set switch 1 and a speed sensor 3 correspond to the desired speed setting means 12 and the running speed detecting means 10, respectively. A microcomputer 22 is started to operate upon a closure of the main switch 5 and comprises an input circuit 22a for processing the signals from the set switch 1, a cancel switch 2 and the speed sensor 3, a memory 22b composed of a ROM and a RAM for storing instruction programs, an output circuit 22c for producing the control signal and a CPU 22d which operates according to the instruction programs in the memory 22b to process a signal from the input circuit 22a and provide an output to the output circuit 22c.

An electromagnetic valve 23 is adapted to be controlled by a control signal $y_1$ from the microcomputer 22, such that it cuts a communication between an output tube 23a connected to a negative pressure source (not shown) and an input tube 23b thereof when the control signal $y_1$ is in "L" level and establishes the communication in a direction shown by an arrow A when the level is "H".

Another electromagnetic valve 24 is controlled by a control signal $y_2$ from the microcomputer 22 such that it cuts a communication between its input tube 24a opened to atmosphere and an output tube 24b when the level of signal $y_2$ is "H" and allows the communication in a direction shown by an arrow B when the level is "L".

A diaphram device 25 has a housing 25c, an air chamber 25b connected to the input tube 23b of the electromagnetic valve 23 and the output tube 24b of the electromagnetic valve 24, a diaphram 25d connected through a rod 25a to the throttle valve 9 and a spring 25e for biasing the diaphram 25d rightwardly on the drawing sheet. The diaphram device 25 and the electromagnetic valves 23 and 24 constitute the throttle valve driving means 17. The throttle valve driving means 17 has three operation modes as shown in the following Table:

| Operation Mode | $y_1$ | $y_2$ | Throttle Valve |
|---|---|---|---|
| Acceleration | H | H | Open |
| Deceleration | L | L | Close |
| Holding | L | H | Constant |

That is, when the control signals $y_1$ and $y_2$ are both in "H" level, the operation mode is Acceleration and the electromagnetic valve 23 is opened and the valve 24 is closed so that the air chamber 25b of the diaphram device 25 is connected to only the negative pressure source and the diaphram 25d is pushed leftwardly to open the throttle valve 9 to thereby accelerate the vehicle.

When the control signals $y_1$ and $y_2$ are both in "L" level, the operation mode is Deceleration and the electromagnetic valves 23 and 24 are closed and opened, respectively, so that the air chamber 25b is opened to the atmosphere and the diaphram 25d is moved rightwardly with an aid of the spring 25e. Therefore, the throttle valve 9 is closed to decelerate the vehicle.

In the Holding mode in which the control signals $y_1$ and $y_2$ are in "L" and "H" levels, respectively, the electromagnetic valves 23 and 24 are closed and the air chamber 25b is connected to neither the negative pressure source nor to the atmosphere. Therefore, the diaphram 25d is held stationary and the opening of the throttle valve 9 is held constant. In FIG. 2, a reference numeral 26 depicts a solenoid driving circuit for driving a gear change solenoid 27.

Figure 3:
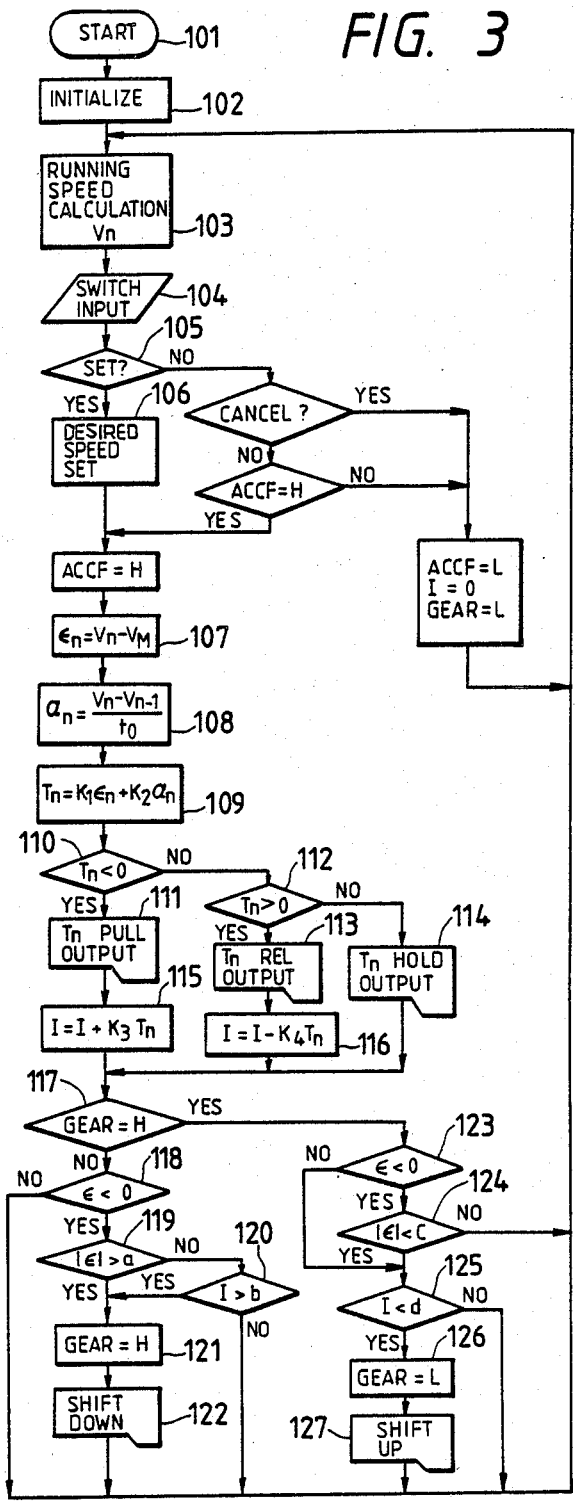
FIGS. 3 and 4 are flow-charts showing an operation of the present device.
Figure 4:
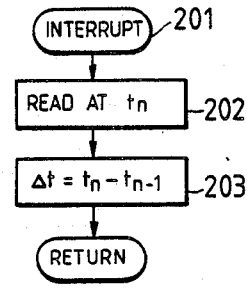
Figure 5:
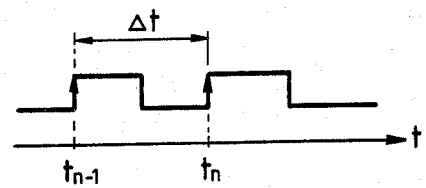
FIG. 5 is an output waveform of a speed sensor.
Figure 6:
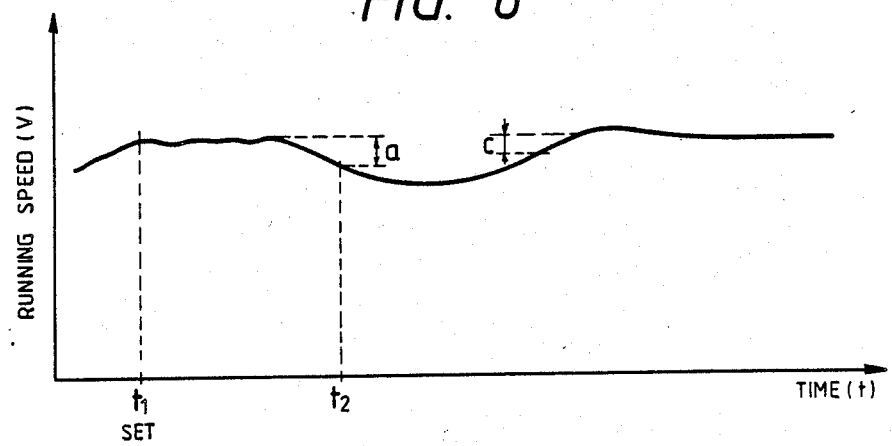
FIG. 6 is a graph showing a variation of speed.
Figure 7:
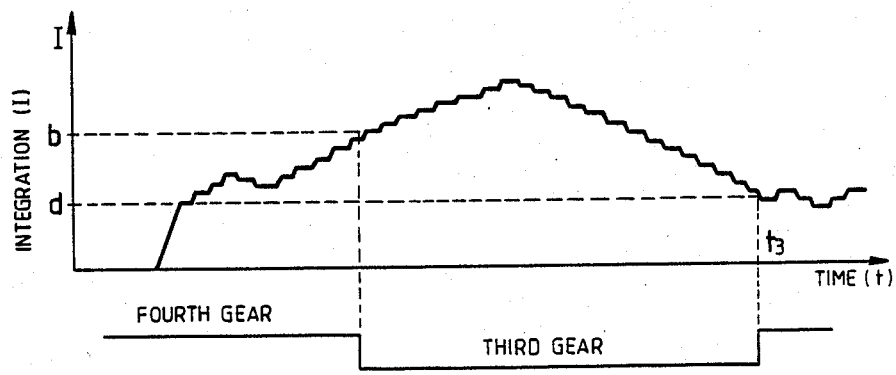
FIG. 7 is a graph showing a variation of an integrated value I.

In operation, when the main switch 5 is closed, the microcomputer 22 starts to execute a main routine shown by a flow-chart in FIG. 3. On the other hand, the speed sensor 3 produces a series pulse signal such as shown in FIG. 5 having a frequency proportional to a running speed during a running condition of the vehicle, which causes an interrupt routine shown in FIG. 4. That is, the interrupt routine is executed every leading edge of pulse of the pulse signal as shown in the step 201 and a time t at which the leading edge is input is read out from a timer (not shown) as shown in the step 202. Then, a difference $\Delta t(t_n - t_{n-1})$ between it and a preceding time $t_{n-1}$, i.e., a period, is obtained as shown on the step 203 and, thereafter, it is returned to the main routine in FIG. 3.

After the microcomputer 22 is initialized (step 102), a running speed $V_n$ (g/$\Delta t$: where g is a scaling factor of speed) at that moment according to a newest pulse period t obtained by the interrupt routine (step 103). The, when an operator closes the set switch 1 to start the constant speed running, the microcomputer 22 receives a corresponding signal and judges whether or not the signal is from the set switch 1 as in the step 105. If yes, the computer 22 determines the running speed signal $V_n$ and uses it as the desired speed signal $V_m$ in the step 106. Then, as shown in the step 107, a speed deviation signal $\epsilon_n$ ($V_n - V_m$) is obtained from the desired speed signal $V_m$ and the running speed signal $V_n$ and, as shown in the step 108, an acceleration signal $\alpha_n$ ($V_n - V_{n-1}$)/$t_0$ is obtained from the running speed signals $V_n$ and $V_{n-1}$. Further, as shown in the step 109, the control amount for regulating the opening of the throttle valve 9 is calculated and output. The control amount $T_n$ for producing the control signals $y_1$ and $y_2$ is obtained according to the following equation:

$$T_n = K_1 \epsilon_n + K_2 \alpha_n$$

where $K_1$ is a coefficient for obtaining $T_n$ from the speed deviation $\epsilon_n$ and $K_2$ is a coefficient for obtaining the control amount from the acceleration $\alpha_n$.

If $T_n < 0$ (step 110), the throttle valve 9 is opened to provide an acceleration output (step 111). If $T_n > 0$ (step 112), the throttle valve 9 is closed to provide a deceleration output (step 113). If $T_n \approx 0$ (step 114), the opening of the throttle valve 9 is held constant. Then, for the case of the step 111, the control amount for controlling the driving force is integrated according to the following equation as shown in the step 115:

$$I_n = I + K_3 T_n$$

where $K_3$ is a constant.

In the case of the step 113, the integration is performed according to the following equation as shown in the step 116:

$$I_n = I - K_4 T_n$$

where $K_4$ is a constant.

Then, as shown in the step 117, it is determined whether or not the gear ratio is high. If no and if the speed deviation $\epsilon$ is negative (step 118), it is determined in the step 119 whether or not an absolute value of $\epsilon$ is larger than a predetermined value a. If yes, the gear mode is set to third gear in the step 121 and then the gear is shifted down in the step 122.

When, in the step 117, the gear is the third gear and the deviation is negative (step 123), and further an absolute value thereof is smaller than a predetermined value c (step 124) and the integrated value I is smaller than a predetermined value d, the gear mode is set to the fourth gear (step 126) and the gear is shifted up in the step 127. The values a, b, c and d are constants and satisfy a>c and b>d.

Thus, the shift-up or shift-down of the gear is performed correspondingly to the running resistance caused by the road condition and/or vehicle weight, resulting in a more exact control of running speed of the vehicle.

What is claimed is:

1. A running speed control device for holding a running speed of a vehicle at a constant level, said device comprising:
   a running speed detector for providing a running speed signal corresponding to said running speed;
   an acceleration detector for receiving said running speed signal at a predetermined time interval to provide an acceleration signal;
   means for setting a desired speed signal which corresponds to said desired constant speed level;
   means for providing a speed deviation signal representing a speed deviation between said running speed and said constant speed level in response to said running speed signal and said desired speed signal;
   means for providing a control signal based on said acceleration signal and said speed deviation signal;
   driving force means responsive to said control signal to change a driving power of the vehicle such that the running speed becomes equal to the desired constant speed level;
   means for integrating said control signal on a time basis to simulate a variation of said driving power; and
   automatic transmission means for changing a gear ratio in response to said integrating means and said speed deviation signal.

2. A running speed control device as claimed in claim 1, wherein said automatic transmission means comprises:
   means for changing the gear ratio when the speed deviation or the integrated amount exceeds a predetermined value; and
   means for returning said changed gear ratio to the previous gear ratio when the speed deviation or the integrated amount falls below said predetermined value.

* * * * *